Patent [19] [11] 4,204,993
Chapman [45] May 27, 1980

[54] NONDIFFUSIBLE 6-ARYLAZO-2-AMINO-3-PYRIDINOL DYE-RELEASING COMPOUNDS

[75] Inventor: Derek D. Chapman, Rochester, N.Y.

[73] Assignee: Eastman Kodak Company, Rochester, N.Y.

[21] Appl. No.: 3,836

[22] Filed: Jan. 16, 1979

Related U.S. Application Data

[60] Continuation-in-part of Ser. No. 927,188, Jul. 24, 1978, abandoned, which is a division of Ser. No. 822,189, Aug. 5, 1977, abandoned.

[51] Int. Cl.² .................. C09B 29/36; G03C 1/40; G03C 5/54; G03C 7/00
[52] U.S. Cl. .................. 260/156; 260/543 F; 260/556 A; 430/202; 430/211; 430/226; 430/243; 430/188; 430/503; 430/566
[58] Field of Search .................. 260/156, 197, 163

[56] References Cited

U.S. PATENT DOCUMENTS

| | | | |
|---|---|---|---|
| 3,751,406 | 8/1973 | Bloom | 260/162 |
| 3,928,312 | 12/1975 | Fleckenstein | 260/156 |
| 3,929,760 | 12/1975 | Landholm et al. | 260/197 |
| 3,931,144 | 1/1976 | Eldredge et al. | 260/197 |
| 3,932,380 | 1/1976 | Krutak et al. | 260/197 |
| 3,932,381 | 1/1976 | Haase et al. | 260/197 |
| 3,993,638 | 11/1976 | Fleckenstein | 260/197 |
| 4,013,635 | 3/1977 | Landholm et al. | 260/199 |
| 4,142,891 | 3/1979 | Baigrie et al. | 96/26 D |

Primary Examiner—Floyd D. Higel
Attorney, Agent, or Firm—Harold E. Cole

[57] ABSTRACT

Photographic elements, diffusion transfer assemblages and processes are described which employ a novel nondiffusible compound having a releasable 6-arylazo-2-amino-3-pyridinol dye moiety or precursor thereof. The compound contains in the ortho position of the arylazo moiety a ballasted carrier moiety attached thereto either through a sulfonamido linking group or through the oxygen of a

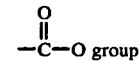

which said ballasted carrier moiety contains, the ballasted carrier moiety being capable of releasing the diffusible 6-arylazo-2-amino-3-pyridinol dye or precursor thereof under alkaline conditions. The dye is transferred imagewise to an image-receiving layer, where it is contacted with metal ions to form a metal-complexed 6-arylazo-2-amino-3-pyridinol dye transfer image of excellent stability.

14 Claims, No Drawings

NONDIFFUSIBLE 6-ARYLAZO-2-AMINO-3-PYRIDINOL DYE-RELEASING COMPOUNDS

This application is a continuation-in-part of our copending U.S. application Ser. No. 927,188, filed July 24, 1978, now abandoned which in turn is a divisional of our copending U.S. application Ser. No. 822,189, filed Aug. 5, 1977, now abandoned.

This invention relates to photography and more particularly to color diffusion transfer photography employing certain nondiffusible azo dye-releasing compounds which, as a function of development of a silver halide emulsion layer, release a diffusible, metallizable, 6-arylazo-2-amino-3-pyridinol dye or precursor thereof. Highly stable metal complexes of this dye are formed in an image-receiving layer.

Azo dye developers containing metallizable groups are disclosed in U.S. Pat. Nos. 3,081,167; 3,196,014; 3,299,041; 3,453,107; and 3,563,739. Since it is a reactive species, however, the developer moiety of such dye developers is capable of developing any exposed silver halide emulsion layer that it comes into contact with, rather than just developing the adjacent silver halide emulsion with which it is associated. Unwanted wrong-layer development, therefore, can occur in dye developer systems which results in undesirable interimage effects. Accordingly, it is desirable to provide an improved transfer system in which the dye is not attached to a "reactive" moiety, such as a developer moiety, so that such dye can diffuse throughout the photographic film unit without becoming immobilized in undesired areas.

In U.S. Published Patent Application No. B 351,673, published Jan. 28, 1975, nondiffusible dye releasing compounds are disclosed. Among the various dye moieties disclosed which can be released are "metal complexed dyes". No specific structures are shown, however.

In U.S. Pat. Nos. 3,931,144; 3,932,380; 3,942,987; 3,954,476; 4,001,209; 4,013,633 and 4,013,635, various non-diffusible azo dye-releasing compounds are disclosed. The released dyes, however, are not disclosed as being metallized or metallizable.

The April 1977 edition of *Research Disclosure*, pages 32 through 39, discloses various nondiffusible dye-releasing compounds and various metallized azo dye fragments. Such premetallized dyes are large molecules which diffuse more slowly than unmetallized dyes, resulting in long access times for image formation. In any event, the specific compounds employed in the instant invention are not disclosed, however.

U.S. Pat. Nos. 3,086,005; 3,492,287 and 3,985,499 disclose various azo dyes, U.S. Pat. Nos. 2,348,417; 2,495,244; and 2,830,042 and French Pat. Nos. 1,124,882 and 1,200,358 disclose various dyes from azopyridines, while U.S. Pat. Nos. 2,868,775; 2,938,895; 3,097,196; 3,691,161; and 3,875,139; British Pat. No. 899,758; and an article entitled "The Irgalan Dyes—Neutral-Dyeing Metal-Complex Dyes" by Guido Schetty, J. Soc. Dyers and Colourists, Volume 71, 1955, pages 705 through 724, disclose various metal complexed dyes. Again, however, neither the specific compounds employed in the instant invention nor the results obtained therewith are disclosed.

It would be desirable to provide improved dye-releasing compounds containing chelating dye moieties, so that the dye which is released imagewise during processing can diffuse to an image-receiving layer containing metal ions to form a metal-complexed, dye transfer image having better hues, rapid diffusion rates and shorter access times than those of the prior art, as well as good stability to heat, light and chemical reagents.

A photographic element in accordance with the invention comprises a support having thereon at least one photosensitive silver halide emulsion layer having associated therewith a nondiffusible compound having a releasable 6-arylazo-2-amino-3-pyridinol dye moiety or precursor thereof containing in the ortho position of the arylazo moiety a ballasted carrier moiety attached thereto either through a sulfonamido linking group or through the oxygen of a

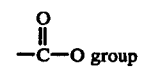

group which said ballasted carrier moiety contains, the ballasted carrier moiety being capable of releasing the diffusible 6-arylazo-2-amino-3-pyridinol dye or precursor thereof under alkaline conditions, e.g., as a function of development of the silver halide emulsion layer.

In a preferred embodiment of the invention, the 6-arylazo-2-amino-3-pyridinol dye-releasing compound or precursor thereof may be represented by the formula:

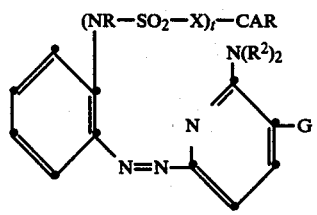

wherein:

(a) X represents a bivalent linking group of the formula $-R^1-L_n-R^1{}_p-$ where each $R^1$ can be the same or different and each represents an alkylene radical having 1 to about 8 carbon atoms, such as methylene, ethylene, propylene, butylene, hexylene, etc, as well as branched alkylene radicals, such as:

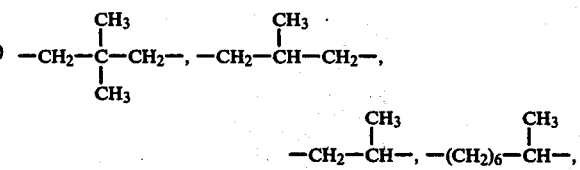

etc; a phenylene radical, or a substituted phenylene radical having 6 to about 9 carbon atoms, such as o-, m- or p-phenylene, o-, m- or p-phenylene substituted with chloro, methoxy, butoxy, bromo, nitro, methyl, ethyl, carboxy, sulfo, etc;

(b) L represents a bivalent radical selected from oxy, imino, carbonyl, carboxamido, carbamoyl, sulfonamido, ureylene, sulfamoyl, sulfinyl or sulfonyl;

(c) n is an integer of 0 or 1;

(d) p is 1 when n equals 1 and p is 1 or 0 when n equals 0, provided that when p is 1 the carbon content of the sum of both $R^1$ radicals does not exceed 14 carbon atoms;

(e) R represents a hydrogen atom, a hydrolyzable acyl group having the formula —COR³ or —COOR³, wherein R³ is an alkyl group having 1 to about 4 carbon atoms, such as methyl, ethyl, propyl, isopropyl, butyl, etc (said alkyl groups may also be substituted, such as with chloro, hydroxy, methoxy, etc), or an aryl (including substituted aryl) group having 6 to about 8 carbon atoms, such as phenyl, p-methoxyphenyl, p-sulfamoylphenyl, p-chlorophenyl, etc, or a hydrolyzable alkanesulfonyl group having 1 to about 4 carbon atoms, such as methylsulfonyl, propylsulfonyl, etc;

(f) each R² represents a hydrogen atom, an alkyl group having 1 to about 6 carbon atoms, such as methyl, ethyl, propyl, isopropyl, butyl, hexyl, etc (said alkyl groups may also be substituted, such as with chloro, hydroxy, methoxy, etc), or an aryl (including substituted aryl) group having 6 to about 8 carbon atoms, such as phenyl, p-methoxyphenyl, p-sulfamoylphenyl, p-chlorophenyl, etc;

(g) CAR represents said ballasted carrier moiety;

(h) t is an integer of 0 or 1, with the proviso that when t is 0 then CAR contains a

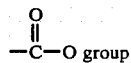

and is attached to the phenyl group through the oxygen of said

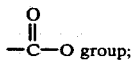

and (i) G represents hydroxy or a precursor thereof.

Good cyan dyes are obtained in this embodiment when the phenyl group is substituted with a nitro group para to the azo linkage, and each R² is H. Other substituents may also be present in the two rings such as alkyl of 1 to 6 carbon atoms, alkoxy, halogens, phenylsulfamoyl, solubilizing groups such as sulfonamido, sulfamoyl, carboxy, sulfo, hydrolyzable precursors thereof, etc.

The specific location of the ballasted carrier moiety on the phenyl group, rather than being on the pyridine ring, as is the case in Compound 11 of U.S. Pat. No. 4,142,891 of Baigrie et al, issued Mar. 6, 1979, frees the amino group on the pyridine ring to exert its stronger electron-donating capability necessary to provide a metallized cyan dye of better, deeper hue in the image-receiving layer. Such dyes have a sharper cutoff on the short wavelength side of the absorption spectrum, thereby avoiding unwanted absorption in the green region.

As stated above, G can represent hydroxy or a precursor thereof. Any such precursor can be employed in our invention, as long as it is converted to hydroxy under alkaline conditions of photographic processing. Examples of hydroxy precursors include salts thereof, such as alkali metal salts, photographically inactive amine salts, etc, as disclosed in U.S. Pat. No. 3,932,380; hydrolyzable acyloxy groups having the formula

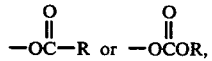

wherein R is an alkyl radical having 1 to about 18 carbon atoms, phenyl or substituted phenyl having 6 to about 18 carbon atoms, as disclosed in U.S. Pat. No. 3,932,380; and groups which, under alkaline conditions, are cleavable from the dye by an intramolecular nucleophilic displacement reaction, as described in U.S. application Ser. No. 949,462 of Mooberry and Archie, filed Oct. 10, 1978, the disclosure of which is hereby incorporated by reference. When precursors of the dye moiety of the above compounds are employed, the absorption spectrum of the azo dye is shifted to shorter wavelengths. "Shifted dyes" of this type absorb light outside the range to which the associated silver halide layer is sensitive.

There is great latitude in selecting a CAR moiety which is attached to the dye-releasing compounds described above. It should also be noted that when the dye moiety is released from the compound, cleavage may take place in such a position that part or all of the linking group, and even part of the ballasted moiety may be transferred to the image-receiving layer along with the dye moiety. In any event, the dye nucleus as shown above can be thought of as the "minimum" which is transferred.

CAR moieties useful in the invention are described in U.S. Pat. Nos. 3,227,550; 3,628,952; 3,227,552; and 3,844,785 (dye released by chromogenic coupling); U.S. Pat. Nos. 3,443,939 and 3,443,940 (dye released by intramolecular ring closure); U.S. Pat. Nos. 3,698,897 and 3,725,062 (dye released from hydroquinone derivatives); U.S. Pat. No. 3,728,113 (dye released from a hydroquinonylmethyl quaternary salt); U.S. Pat. Nos. 3,719,489 and 3,443,941 (silver ion induced dye release); and U.S. Pat. Nos. 3,245,789 and 3,980,497; Canadian Pat. No. 602,607; British Pat. No. 1,464,104; *Research Disclosure* 14447, April, 1976; and U.S. Pat. No. 4,139,379 issued Feb. 13, 1979 of Chasman et al (dye released by miscellaneous mechanisms), the disclosures of which are hereby incorporated by reference.

In a further preferred embodiment of the invention, the ballasted carrier moiety or CAR as described above may be represented by the following formula:

(Ballast-Carrier)— wherein:

(a) Ballast is an organic ballasting radical of such molecular size and configuration as to render the compound nondiffusible in a photographic element during development in an alkaline processing composition; and (b) Carrier is an oxidizable acyclic, carbocyclic or heterocyclic moiety (see "The Theory of the Photographic Process", by C. E. K. Mees and T. H. James, Third Edition, 1966, pages 282 to 283), e.g., moieties containing atoms according to the following configuration:

a (—C=C)$_b$— wherein:

b is a positive integer of 1 to 2; and a represents the radicals OH, SH, NH—, or hydrolyzable precursors thereof.

The Ballast group in the above formula is not critical as long as it confers nondiffusibility to the compound. Typical Ballast groups include long-chain alkyl radicals as well as aromatic radicals of the benzene and naphthalene series linked to the compound. Useful Ballast groups generally have at least 8 carbon atoms such as substituted or unsubstituted alkyl groups of 8 to 22 carbon atoms, a carbamoyl radical having 8 to 30 carbon atoms such as —CONH(CH$_2$)$_4$—O—C$_6$H$_3$(C$_5$H$_{11}$)$_2$, —CON(C$_{12}$H$_{25}$)$_2$, etc., a keto radical having 8 to 30 carbon atoms such as —CO—C$_{17}$H$_{35}$, —CO—C$_6$H$_4$(t—C$_{12}$H$_{25}$), etc.

For specific examples of Ballast-Carrier moieties useful as the CAR moiety in this invention, reference is made to the November 1976 edition of *Research Disclosure*, pages 68 through 74, and the April 1977 edition of *Research Disclosure*, pages 32 through 39, the disclosures of which are hereby incorporated by reference.

In a highly preferred embodiment of the invention, the ballasted carrier moiety or CAR in the above formulas is a group having the formula:

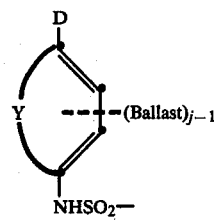

wherein:

(a) Ballast is an organic ballasting radical of such molecular size and configuration (e.g., simple organic groups or polymeric groups) as to render the compound nondiffusible in a photographic element during development in an alkaline processing composition;

(b) D is OR$^4$ or NHR$^5$ wherein R$^4$ is hydrogen or a hydrolyzable moiety, such as acetyl, mono-, di- or trichloroacetyl radicals, perfluoroacyl, pyruvyl, alkoxyacyl, nitrobenzoyl, cyanobenzoyl, sulfonyl, sulfinyl, etc, and R$^5$ is hydrogen or a substituted or unsubstituted alkyl group of 1 to 22 carbon atoms such as methyl, ethyl, hydroxyethyl, propyl, butyl, secondary butyl, tert-butyl, cyclopropyl, 4-chlorobutyl, cyclobutyl, 4-nitroamyl, hexyl, cyclohexyl, octyl, decyl, octadecyl, dodecyl, benzyl, phenethyl, etc. (when R$^5$ is an alkyl group of greater than 8 carbon atoms, it can serve as a partial or sole Ballast);

(c) Y represents the atoms necessary to complete a benzene nucleus, a naphthalene nucleus, or a 5- to 7-membered heterocyclic ring such as pyrazolone, pyrimidine, etc; and (d) j is a positive integer of 1 to 2 and is 2 when D is OR$^4$ or when R$^5$ is hydrogen or an alkyl group of less than 8 carbon atoms.

Especially good results are obtained in the above formula when D is OH, j is 2, Y is a naphthalene nucleus, R is H, each R$^2$ is H, X is a phenylene radical, and the phenyl group is substituted with a nitro group para to the azo linkage.

Examples of the CAR moiety in this highly preferred embodiment are disclosed in U.S. Published Patent Application No. B 351,673; U.S. Pat. No. 3,928,312; French Pat. No. 2,284,140; and German Pat. Nos. 2,406,664; 2,613,005; and 2,505,248, the disclosures of which are hereby incorporated by reference, and include the following:

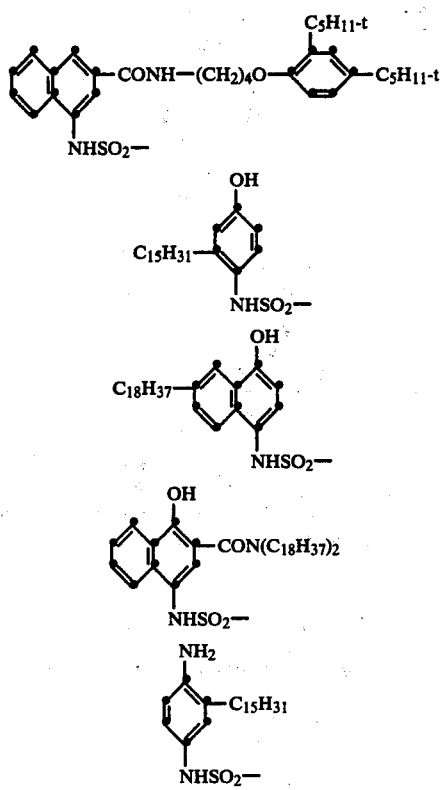

In another highly preferred embodiment of the invention, the ballasted carrier moiety or CAR in the above formulas is such that the diffusible azo dye is released as an inverse function of development of the silver halide emulsion layer under alkaline conditions. This is ordinarily referred to as positive-working dye-release chemistry. In one of these embodiments, the ballasted carrier moiety or CAR in the above formulas may be a group having the formula:

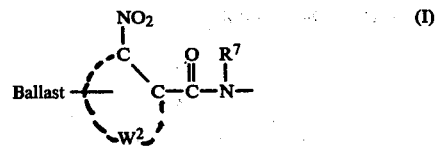

wherein:

Ballast is an organic ballasting radical of such molecular size and configuration as to render the compound nondiffusible in a photographic element during development in an alkaline processing composition;

W$^2$ represents at least the atoms necessary to complete a benzene nucleus (including various substituents thereon); and R$^7$ is an alkyl (including substituted alkyl) radical having 1 to about 4 carbon atoms.

Examples of the CAR moiety in this formula I include the following:

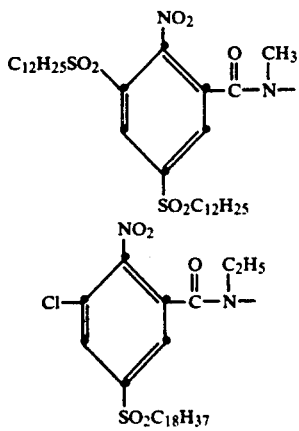

In a second embodiment of positive-working dye-release chemistry as referred to above, the ballasted carrier moiety or CAR in the above formulas may be a group having the formula:

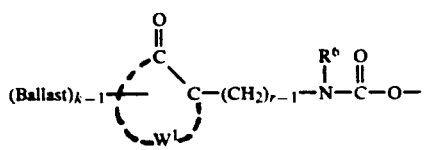

(II)

wherein:

Ballast is an organic ballasting radical of such molecular size and configuration as to render the compound nondiffusible in a photographic element during development in an alkaline processing composition;

$W^1$ represents at least the atoms necessary to complete a quinone nucleus (including various substituents thereon);

r is a positive integer of 1 or 2;

$R^6$ is an alkyl (including substituted alkyl) radical having 1 to about 40 carbon atoms or an aryl (including substituted aryl) radical having 6 to about 40 carbon atoms; and k is a positive integer of 1 to 2 and is 2 when $R^6$ is a radical of less than 8 carbon atoms.

Examples of the CAR moiety in this formula II include the following:

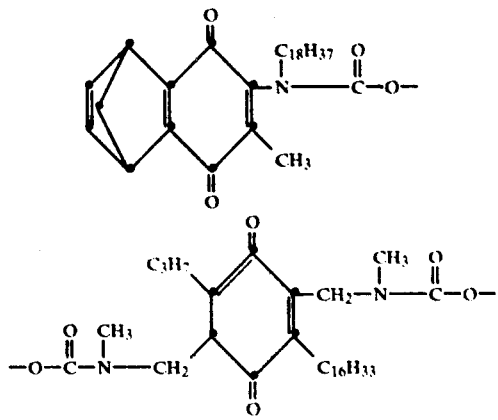

In using the compounds in formulas I and II above, they are employed in a photographic element similar to the other nondiffusible dye-releasers described previously. Upon reduction of the compound as a function of silver halide development under alkaline conditions, the metallizable azo dye is released. In this embodiment, conventional negative-working silver halide emulsions, as well as direct-positive emulsions, can be employed. For further details concerning these particular CAR moieties, including synthesis details, reference is made to U.S. Pat. No. 4,139,379 of Chasman et al. issued Feb. 13, 1979, the disclosure of which is hereby incorporated by reference.

In a third embodiment of positive-working dye-release chemistry as referred to above, the ballasted carrier moiety or CAR in the above formulas may be a group having the formula:

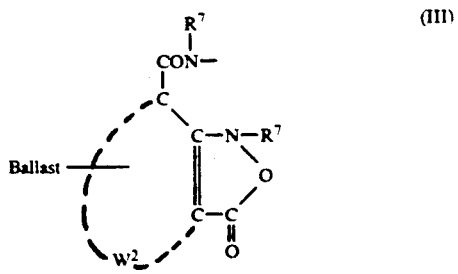

(III)

wherein: Ballast, $W^2$ and $R^7$ are as defined for formula I above.

Examples of the CAR moiety in this formula III include the following:

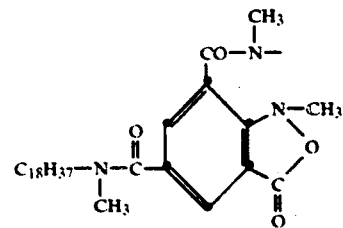

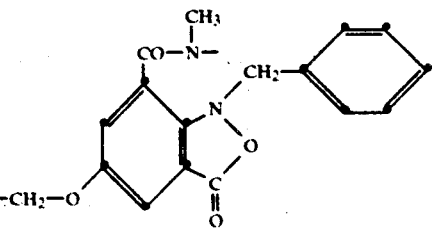

For further details concerning this particular CAR moiety, including synthesis details, reference is made to commonly assigned copending U.S. application Ser. No. 534,966 of Hinshaw et al, filed Dec. 20, 1974, the disclosure of which is hereby incorporated by reference.

In a fourth embodiment of positive-working dye-release chemistry as referred to above, the ballasted carrier moiety or CAR in the above formulas may be a group having the formula:

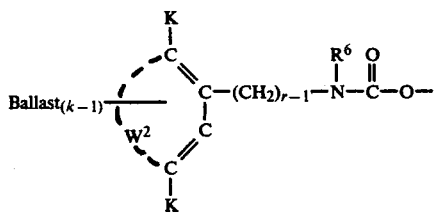

(IV)

wherein:
Ballast, r, $R^6$ and k are as defined for formula II above;
$W^2$ is as defined for formula I above; and
K is OH or a hydrolyzable precursor thereof.

Examples of the CAR moiety in this formula IV include the following:

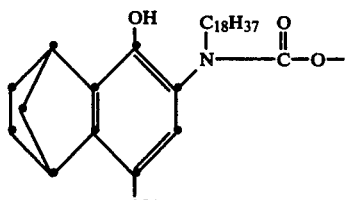

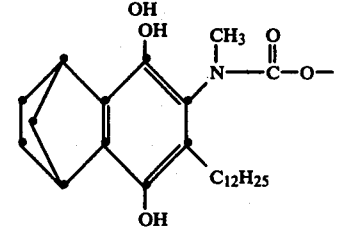

For further details concerning this particular CAR moiety, including synthesis details, reference is made to U.S. Pat. No. 3,980,479 of Fields et al, issued Sept. 14, 1976, the disclosure of which is hereby incorporated by reference.

Representative compounds included within the scope of the invention include the following:

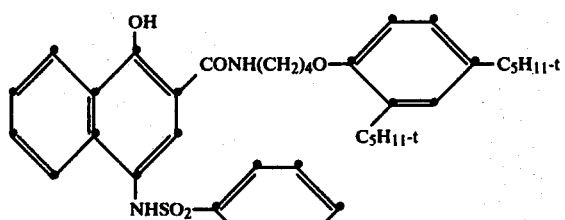

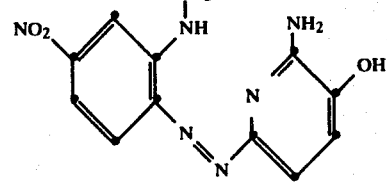

1

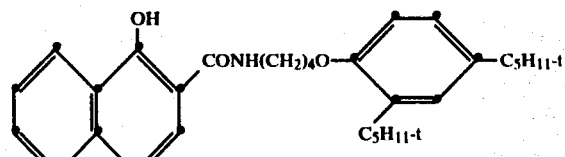

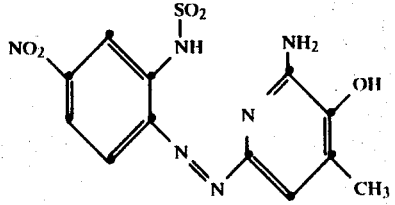

2

-continued
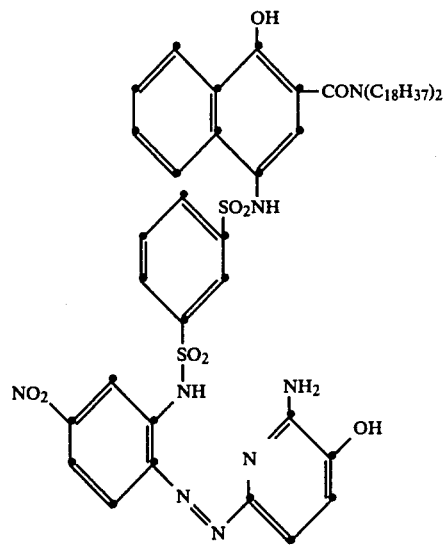
3
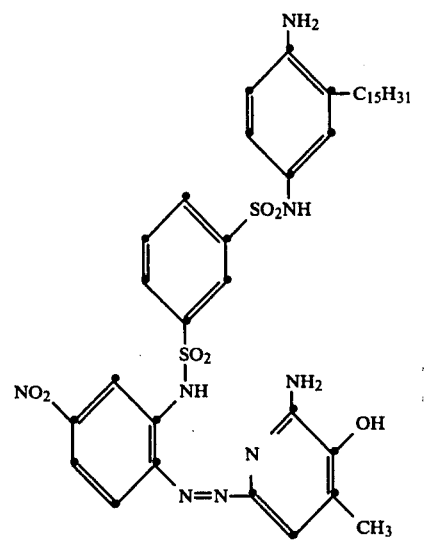
4
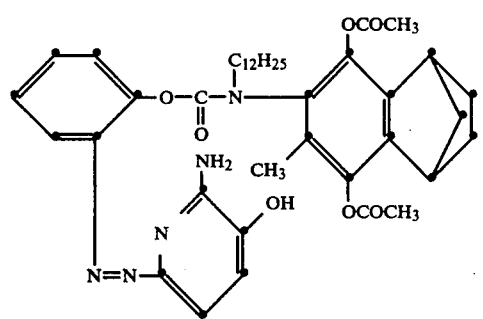
5

-continued
6
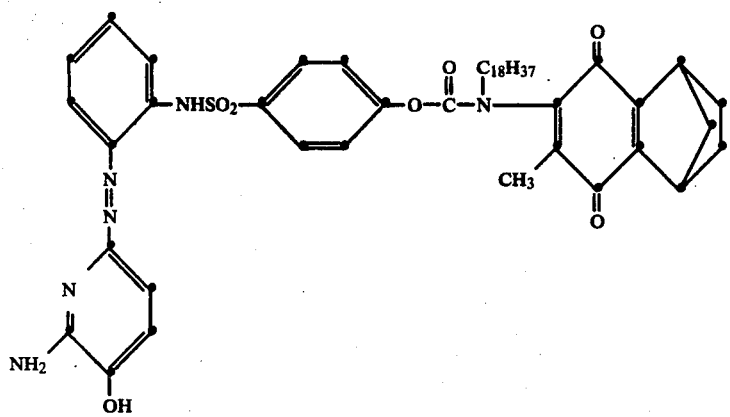
7
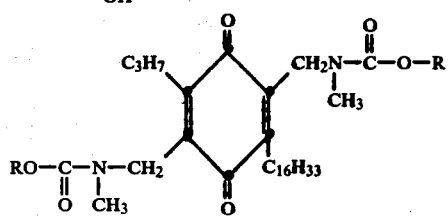
R = NO₂
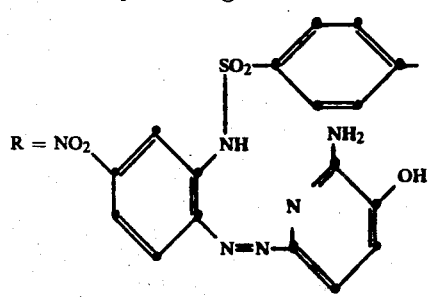
8
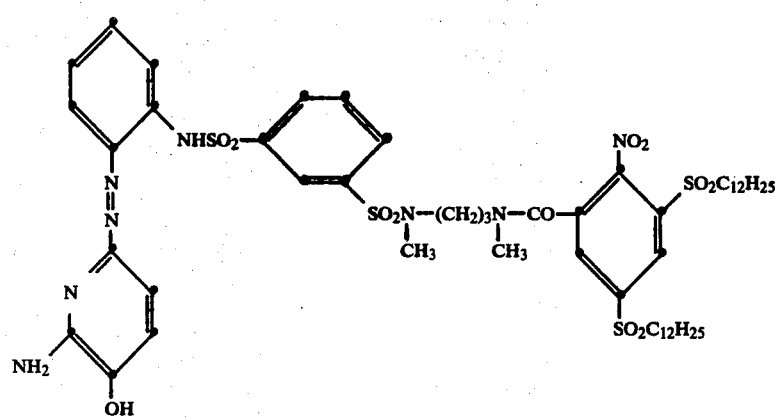
9
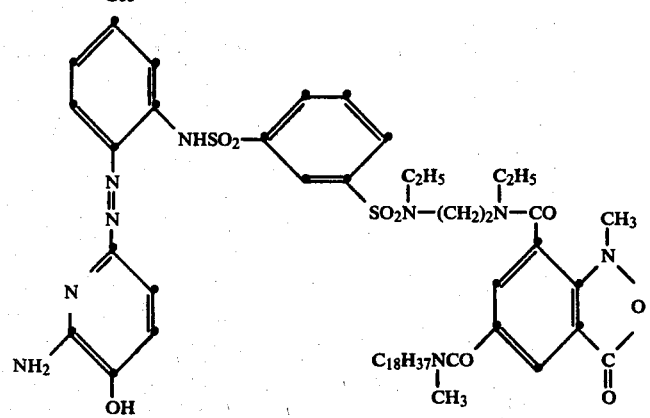

-continued

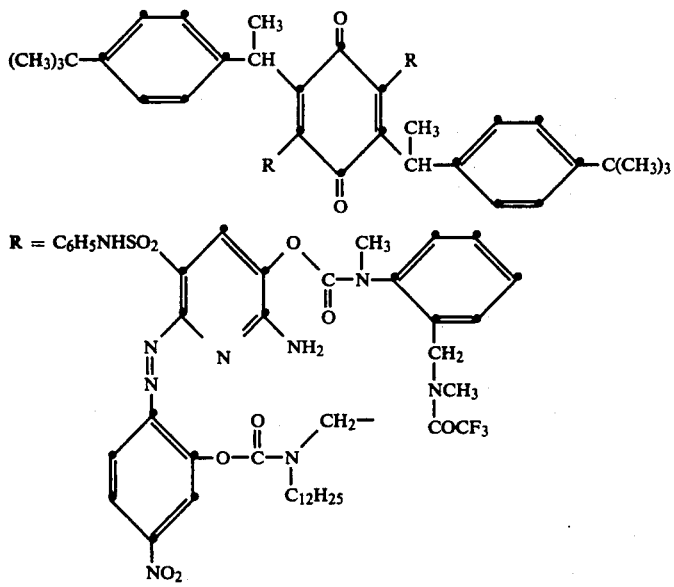

A process for producing a photographic transfer image in color according to the invention comprises:

(a) treating an imagewise-exposed photographic element as described above with an alkaline processing composition in the presence of a silver halide developing agent to effect development of each of the exposed silver halide emulsion layers;

(b) the dye-releasing compound then releasing the diffusible azo dye as described above imagewise as a function of the development of each of the silver halide emulsion layers;

(c) at least a portion of the imagewise distribution of the azo dye diffusing to a dye image-receiving layer; and (d) contacting the imagewise distribution of azo dye with metal ions, thereby forming a metal-complexed azo dye transfer image.

In another preferred embodiment of the invention, a process for producing a photographic transfer image in color according to the invention comprises:

(a) treating an imagewise-exposed photographic element as described above wherein CAR in the compound has the formula:

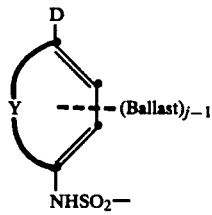

D, Y, and j being defined as above,
with an alkaline processing composition in the presence of a silver halide developing agent to effect development of each of the exposed silver halide emulsion layers, thereby oxidizing the developing agent;

(b) the oxidized developing agent thereby cross-oxidizing the dye-releasing compound;

(c) the cross-oxidized dye-releasing compound then cleaving as a result of alkaline hydrolysis to release the diffusible azo dye imagewise as a function of the imagewise exposure of each of the silver halide emulsion layers;

(d) at least a portion of the imagewise distribution of the azo diffusing to a dye image-receiving layer; and (e) contacting the imagewise distribution of azo dye with metal ions, thereby forming a metal-complexed azo dye transfer image.

The tridentate azo dye ligand which is released from the dye-releasing compounds in accordance with the present invention will form a coordination complex in the image-receiving layer with polyvalent metal ions. The metal ions can be present in the image-receiving layer itself or in a layer adjacent thereto or the image-receiving layer can be contacted with metal ions in a bath after diffusion of the dye has taken place. Metal ions most useful in the invention are those which are essentially colorless when incorporated into the image-receiving element, are inert with respect to the silver halide layers, react readily with the released dye to form a complex of the desired hue, are tightly coordinated to the dye in the complex, have a stable oxidation state, and form a dye complex which is stable to heat, light and chemical reagents. In general, good results are obtained with polyvalent metal ions such as copper (II), zinc (II), nickel (II), platinum (II), palladium (II) and cobalt (II) ions.

For example, it is believed that the coordination complex which is formed from the tridentate azo dye ligand according to the invention in one of the preferred embodiments thereof has the following structure:

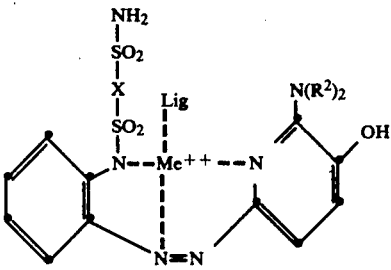

where X and $R^2$ are as defined previously, Me is metal and Lig is one or more ligand groups depending upon the coordination number of the metal ions, such as $H_2O$, Cl, pyridine, etc.

Thus, in accordance with this preferred embodiment of the invention, a photographic element is provided which comprises a support having thereon a coordination complex of a polyvalent metal ion and a compound having the formula:

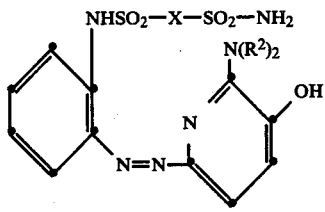

wherein X and $R^2$ are as described previously. The element usually contains a photographic mordant or image-receiving layer to bind the dye or coordination complex thereto. The structures shown above may also, of course, be substituted in the same manner as described above for the starting compounds from which they are released, e.g., the phenyl group may have a nitro group para to the azo linkage, etc.

It will be appreciated that, after processing the photographic element described above, there remains in it after transfer has taken place an imagewise distribution of azo dye in addition to developed silver. A color image comprising residual nondiffusible compound may be obtained in this element if the residual silver and silver halide are removed by any conventional manner well known to those skilled in the photographic art, such as a bleach bath, followed by a fix bath, a bleach-fix bath, etc. Such a retained dye image should normally be treated with metal ions to metallize the dyes to increase their light fastness and shift their spectral absorption to the intended region. The imagewise distribution of azo dye may also diffuse out of the element into these baths, if desired, rather than to an image-receiving element. If a negative-working silver halide emulsion is employed in certain preferred photosensitive elements, described above, then a positive color image, such as a reflection print, a color transparency or motion picture film, may be produced in this manner. If a direct-positive silver halide emulsion is employed in such photosensitive elements, then a negative color image may be produced.

The photographic element in the above-described process can be treated with an alkaline processing composition to effect or initiate development in any manner. A preferred method for applying processing composition is by use of a rupturable container or pod which contains the composition. In general, the processing composition employed in this invention contains the developing agent for development, although the composition could also just be an alkaline solution where the developer is incorporated in the photographic element, image-receiving element or process sheet, in which case the alkaline solution serves to activate the incorporated developer.

A photographic film unit which can be processed in accordance with this invention is adapted to be processed by passing the unit between a pair of juxtaposed pressure-applying members, such as would be found in a camera designed for in-camera processing, and comprises:

(1) a photographic element as described above;
(2) a dye image-receiving layer; and
(3) means for discharging an alkaline processing composition within the film unit, such as a rupturable container which is adapted to be positioned during processing of the film unit so that a compressive force applied to the container by the pressure-applying members will effect a discharge of the container's contents within the film unit;

the film unit containing a silver halide developing agent.

In the embodiment described above, the dye image-receiving layer may itself contain metal ions or the metal ions may be present in an adjacent layer, so that the tridentate azo dye ligand which is released will form a coordination complex therewith. The dye thus becomes immobilized in the dye image-receiving layer and metallized at the same time. Alternatively, the dye image in the dye image-receiving layer may be treated with a solution containing metal ions to effect metallization. The formation of the coordination complex shifts the absorption of the dye to the desired hue, usually to longer wavelengths, which have a different absorption than that of the initial dye-releasing compound. If this shift is large enough, then the dye-releasing compound may be incorporated in a silver halide emulsion layer without adversely affecting its sensitivity.

The dye image-receiving layer in the above-described film unit can be located on a separate support adapted to be superposed on the photographic element after exposure thereof. Such image-receiving elements are generally disclosed, for example, in U.S. Pat. No. 3,362,819. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the above-described film unit can also be located integral with the photographic element between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer and dye images are formed as a function of development which diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention can be employed is disclosed in Belgian Pat. No. 757,959. In this embodiment, the support for the photographic element is transparent and is coated with the image-receiving layer, a substantially opaque, light-reflective layer and the photosensitive layer or layers described above. A rupturable container containing an alkaline processing composition and an opacifier is positioned adjacent the top layer and a transparent top sheet which has thereon a neutralizing layer and a timing layer. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development which diffuse to the image-receiving layer to provide a positive, right-reading image which is viewed through the transparent support on the opaque reflecting layer background. For further details concerning the format of this particular integral film unit, reference is made to the above-mentioned Belgian Pat. No. 757,959.

Still other useful integral formats in which this invention can be employed are described in U.S. Pat. Nos. 3,415,644; 3,415,645; 3,415,646; 3,647,437; and 3,635,707. In most of these formats, a photosensitive silver halide emulsion is coated on an opaque support and a dye image-receiving layer is located on a separated transparent support superposed over the layer outermost from the opaque support. In addition, this transparent support also preferably contains a neutralizing layer and a timing layer underneath the dye image-receiving layer.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide negative emulsion layer. The film unit contains a silver halide solvent, preferably in a rupturable container with the alkaline processing composition.

The film unit or assembly used in the present invention may be used to produce positive images in single- or multicolors. In a three-color system, each silver halide emulsion layer of the film assembly will have associated therewith a dye-releasing compound which releases a dye possessing a predominant spectral absorption within the region of the visible spectrum to which said silver halide emulsion is sensitive (initially or after forming the coordination complex), i.e., the blue-sensitive silver halide emulsion layer will have a yellow or yellow-forming dye-releaser associated therewith, the green-sensitive silver halide emulsion layer will have a magenta or magenta-forming dye-releaser associated therewith, and the red-sensitive silver halide emulsion layer will have a cyan or cyan-forming dye-releaser associated therewith, at least one of the dye-releasers being a compound in accordance with the present invention. The dye-releaser associated with each silver halide emulsion layer may be contained either in the silver halide emulsion layer itself or in a layer contiguous to the silver halide emulsion layer.

The concentration of the dye-releasing compounds that are employed in the present invention may be varied over a wide range, depending upon the particular compound employed and the results which are desired. For example, the dye-releasers of the present invention may be coated in layers by using coating solutions containing between about 0.5 and about 8 percent by weight of the dye-releaser distributed in a hydrophilic film-forming natural material or synthetic polymer, such as gelatin, polyvinyl alcohol, etc, which is adapted to be permeated by aqueous alkaline processing composition.

Depending upon which CAR is used in the present invention, a variety of silver halide developing agents can be employed. In certain embodiments of the invention, any silver halide developing agent can be employed as long as it cross-oxidizes with the dye-releasers described herein. The developer may be employed in the photosensitive element to be activated by the alkaline processing composition. Specific examples of developers which can be employed in this invention include:

N-methylaminophenol
Phenidone (1-phenyl-3-pyrazolidone)
Dimezone (1-phenyl-4,4-dimethyl-3-pyrazolidone)
aminophenols
1-phenyl-4-methyl-4-hydroxymethyl-3-pyrazolidone
N,N-diethyl-p-phenylenediamine
N,N,N',N'-tetramethyl-p-phenylenediamine
3-methyl-N,N-diethyl-p-phenylenediamine
3-methoxy-N-ethyl-N-ethoxy-p-phenylenediamine, etc.

The non-chromogenic developers in this list are preferred, however, since they avoid any propensity of staining the dye image-receiving layer.

In a preferred embodiment of the invention, the silver halide developer employed in the process becomes oxidized upon development and reduces silver halide to silver metal. The oxidized developer then cross-oxidizes the dye-releasing compound. The product of cross-oxidation then undergoes alkaline hydrolysis, thus releasing an imagewise distribution of diffusible azo dye which then diffuses to the receiving layer to provide the dye image. The diffusible moiety is transferable in alkaline processing composition either by virtue of its self-diffusivity or by its having attached to it one or more solubilizing groups, for example, a carboxy, sulpho, sulphonamido, hydroxy or morpholino group.

In using the dye-releasing compounds according to the invention which produce diffusible dye images as a function of development, either conventional negative-working or direct-positive silver halide emulsions may be employed. If the silver halide emulsion employed is a direct-positive silver halide emulsion, such as an internal-image emulsion designed for use in the internal image reversal process or a fogged, direct-positive emulsion such as a solarizing emulsion, which is developable in unexposed areas, a positive image can be obtained in certain embodiments on the dye image-receiving layer. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a pH-lowering layer in the film unit or image-receiving unit lowers the pH of the film unit or image receiver to stabilize the image.

Internal-image silver halide emulsions useful in this invention are described more fully in the November 1976 edition of *Research Disclosure*, pages 76 through 79, the disclosure of which is hereby incorporated by reference.

The various silver halide emulsion layers of a color film assembly employed in this invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that may be transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention can be of the type disclosed in U.S. Pat. Nos. 2,543,181; 2,643,886; 2,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye-releasers are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be emloyed in various interlayers of the photographic elements of the invention. Suitable materials are disclosed on page 83 of the November 1976 edition of *Research Disclosure*, the disclosure of which is hereby incorporated by reference.

Any material can be employed as the image-receiving layer in this invention as long as the desired function of mordanting or otherwise fixing the dye images is obtained. The particular material chosen will, of course, depend upon the dye to be mordanted. Suitable materials are disclosed on pages 80 through 82 of the November 1976 edition of *Research Disclosure*, the disclosure of which is hereby incorporated by reference.

Use of a pH-lowering material in the film units employed in this invention will usually increase the stability of the transferred image. Generally, the pH-lowering material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure*, and pages 35 through 37 of the July 1975 edition of *Research Disclosure*, the disclosures of which are hereby incorporated by reference.

A timing or inert spacer layer can be employed in the practice of this invention over the pH-lowering layer which "times" or controls the pH reduction as a function of the rate at which alkali diffuses through the inert spacer layer. Examples of such timing layers and their functioning are disclosed in the *Research Disclosure* articles mentioned in the paragraph above concerning pH-lowering layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably possessing a pH in excess of 11, and preferably containing a developing agent as described previously. Suitable materials and addenda frequently added to such compositions are disclosed on pages 79 and 80 of the November 1976 edition of *Research Disclosure*, the disclosure of which is hereby incorporated by reference.

While the alkaline processing composition used in this invention can be employed in a rupturable container, as described previously, to conveniently facilitate the introduction of processing composition into the film unit, other methods of interesting processing composition into the film unit could also be employed, e.g., interjecting processing solution with communicating members similar to hypodermic syringes which are attached either to a camera or camera cartridge. The processing composition may also be applied by means of a swab or by dipping in a bath, if so desire.

The alkaline solution-permeable, substantially opaque, light-reflective layer employed in certain embodiments of photographic film units used in this invention are described more fully in the November 1976 edition of *Research Disclosure*, page 82, the disclosure of which is hereby incorporated by reference.

The supports for the photographic elements used in this invention can be any material as long as it does not deleteriously affect the photographic properties of the film unit and is dimensionally stable. Typical flexible sheet materials are described on page 85 of the November 1976 edition of *Research Disclosure*, the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone.

The silver halide emulsions useful in this invention, both negative-working and direct-positive ones, are well known to those skilled in the art and are described in *Product Licensing Index*, Volume 92, December 1971, publication 9232, page 107, paragraph I, "Emulsion types"; they may be chemically and spectrally sensitized as described on page 107, paragraph III, "Chemical sensitization", and pages 108 and 109, paragraph XV, "Spectral sensitization", of the above article; they can be protected against the production of fog and can be stabilized against loss of sensitivity during keeping by employing the materials described on page 107, paragraph V, "Antifoggants and stabilizers", of the above article; they can contain development modifiers, hardeners, and coating aids as described on pages 107 and 108, paragraph IV, "Development modifiers"; paragraph VII, "Hardeners"; and paragraph XII, "Coating aids", of the above article; they and other layers in the photographic elements used in this invention can contain plasticizers, vehicles and filter dyes described on page 108, paragraph XI, "Plasticizers and lubricants", and paragraph VIII, "Vehicles", and page 109, paragraph XVI, "Absorbing and filter dyes", of the above article; they and other layers in the photographic elements used in this invention may contain addenda which are incorporated by using the procedures described on page 109, paragraph XVII, "Methods of addition", of the above article; and they can be coated by using the various techniques described on page 109, paragraph XVIII, "Coating procedures", of the above article, the disclosures of which are hereby incorporated by reference.

The term "nondiffusing" used herein has the meaning commonly applied to the term in photography and denotes materials that for all practical purposes do not migrate or wander through organic colloid layers, such as gelatin, in the photographic elements of the invention in an alkaline medium, and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium in the presence of "nondiffusing" materials. "Mobile" has the same meaning.

The term "associated therewith" as used herein is intended to mean that the materials can be in either the same or different layers so long as the materials are accessible to one another.

EXAMPLE 1

Preparation of Compound 1

To 100 ml dry dimethylsulfoxide at 90° C. under nitrogen was added sodium carbonate (8 g). After 30 minutes 4-amino-N-[4-(2,4-di-tert-pentylphenoxy)-butyl]-1-hydroxy-2-naphthamide (2.45 g) was added in one portion and stirred vigorously. 2-Amino-6-[2-(3-fluorosulfonyl-N-methanesulfonylbenzenesulfonamido)-4-nitrophenylazo]-3-pyridinol (2.7 g) was added and heated for another 90 minutes. The mixture was cooled and added to water (1 liter) containing concentrated HCl (20 ml). The product was filtered off and dried.

It was purified by chromatography on Silica gel with chloroform as eluant. The purest fraction was dissolved in ethyl acetate and precipitated by the addition of ligroin. Yield 1.2 g.

Intermediates:

2'-Amino-4'-nitromethanesulfonanilide. 4-Nitro-o-phenylenediamine (30.6 g; 0.2 mole) was nearly dissolved in pyridine (ca. 500 ml.) The mixture was chilled to 5° C. and methanesulfonyl chloride (22.8 g; 0.2 mole) was added dropwise, while stirring, at <10° C. After the addition, the solution was left stirring at the ice bath temperature for about one hour. The reaction solution was poured into ice cold water (~2 liter) and stirred while scratching vigorously. The product was filtered and dried to yield 28.8 g (62 percent) beige solid, m.p. 201° to 204° C.

A small amount of the product was recrystallized from methanol to give m.p. 202° to 204° C.

2'-Amino-3-fluorosulfonyl-N-methanesulfonamido-4'-nitrobenzenesulfonanilide. 2'-Amino-4'-nitromethanesulfonanilide (30.4 g; 0.13 mole) was dissolved in dry tetrahydrofuran (ca. 700 ml) and then triethylamine (13.1 g; 0.13 mole) was added and the solution was chilled to 5° C. While stirring and maintaining a temperature <10° C., While stirring and maintaining a temperature <10° C., m-fluorosulfonylbenzenesulfonyl chloride (33.8 g; 0.13 mole) was added dropwise. After the addition, the reaction was kept at the ice bath temperature for one hour and then stirring continued at room temperature for an additional hour. The reaction solution was poured into ice cold water (about 2 liters) while stirring and scratching vigorously. The product was filtered and dried to yield 50.6 g (85 percent) beige solid, m.p. 204° to 209° C. A small sample (1 g) was recrystallized from ethanol (150 ml) to yield a beige solid, m.p. 224° to 226° C.

2-Amino-6-[2-(3-fluorosulfonyl-N-methanesulfonyl-benzenesulfonamido)-4-nitrophenylazo]-3-pyridinol. Sodium nitrite (1.25 g) was added to concentrated sulfuric acid (30 ml) while cooling. The suspension was warmed to 60° C. to effect solution and then cooled to 20° C. To this solution was added the above sulfonanilide compound (7.6 g; 0.018 mole) in portions. After the addition (about 20 minutes), the mixture was stirred until nearly dissolved. The suspension was then poured into cold "mixed acid" (36 ml of 1/5 propionic/acetic acids) and stirred while chilling.

2-Amino-3-pyridinol (1.99 g; 0.018 mole) was dissolved in "mixed acid" (ca. 600 ml) and buffered by the addition of sodium acetate (80 g). The mixture was chilled to 15° C., and the diazonium solution was added dropwise at 15 to 20° C. After the addition (1.5 hours), the mixture was stirred at the ice bath temperature for 2 hours.

The reaction mixture was diluted with 1 liter of water and filtered. The moist solid was slurried in 1 liter of water, filtered and dried to yield 6.8 g of rust-colored material, m.p. 233° to 238° C. (dec.). The crude product was recrystallized from acetic acid (700 ml) to yield 4.6 g (44 percent) of rust-colored solid, m.p. 241° to 243° C. (dec.).

EXAMPLE 2

Preparation of a single-layer light-sensitive element

Compound 1 was dispersed in di-n-butyl phthalate in a 1:2 ratio using cyclohexanone as an auxiliary solvent. The dispersion was added to a monodispersed 0.8 μm silver bromide emulsion and coated on a polyester film support. The layer comprised 2.2 g/m$^2$ of silver, 3.2 g/m$^2$ of gelatin, and $1.1 \times 10^{-3}$ moles/m$^2$ of Compound 1. It was overcoated by a protective gelatin layer at 1.1 g/m$^2$ containing one percent of bis(vinylsulfonylmethyl)ether as a hardener.

EXAMPLE 3

Dye Diffusion

The above light-sensitive element was exposed to room light. A viscous processing composition was spread between it and the receiving element described below at 22° C. by passing the transparent "sandwich" between a pair of juxtaposed rollers so that the liquid layer is about 75 μm. The receiving elemnt comprised the following layers coated on a transparent polyester support: (1) a mordant layer containing poly(styrene-co-N-benzyl-N,N-dimethyl-N-vinylbenzylammonium sulfate-co-divinylbenzene) and gelatin, each at 2.2 g/m$^2$; (2) a reflecting layer of titanium dioxide (21.5 g/m$^2$) and gelatin (3.7 g/m$^2$); and (3) an overcoat layer of gelatin (3.8 g/m$^2$). The processing composition comprised per liter of aqueous solution: 20 g of sodium hydroxide, 0.75 g of 4-hydroxymethyl-4-methyl-1-phenyl-3-pyrazolidinone, 10 g of potassium bromide and 25 g of hydroxyethylcellulose.

Dye density appearing in the mordant layer was monitored through the transparent support using a recording reflection densitometer. The dye densities set forth in the Table were recorded after 30, 60 and 120 seconds and are a percentage of the ultimate final density. High values represent rapid transfer to the mordant.

EXAMPLE 4

Hue

A room-light exposed sample of the above light-sensitive element was laminated to a transparent receiving element using the same processing composition as above. The transparent element comprised a polyester support bearing a layer containing the same quaternary ammonium salt copolymer as above (2.2 g/m$^2$), gelatin (3.2 g/m$^2$) and hardener. When the dye transferred to the receiver reached a density of about 1.0, it was washed in water, metallized by bathing in a 10 percent solution of CuSO$_4$.5H$_2$O, washed, soaked in a pH 4 buffer solution and dried. Samples were also left unmetallized by simply washing, soaking in the pH 4 buffer, and drying. Another sample was metallized by using a mordant layer as described above containing bis-(acetylacetonato) nickel(II) (0.65 g/m$^2$) in the mordant layer, washed, soaked in a pH 4 buffer solution, and dried. The wavelength at the maximum density ($\lambda_{max}$) of the spectrophotometric curves is recorded in the Table along with the "half band width" (½ BW), the wavelength range of the curve at half the maximum density. The narrow "half band width" generally designates a pure hue.

EXAMPLE 5

Light stability—Fading test

Sample strips of the light-sensitive element prepared above were given a controlled exposure through a step wedge and laminated to a paper receiving element using the same developing composition as described above. This element comprised a polyethylene-coated paper support and a mordant layer of the same composition as on the transparent support in Example 4 above. The receivers were metallized and buffered as above and subjected to 10 days of a high-intensity daylight (5000 footcandles) fading. The loss in density (ΔD) was monitored spectrophotometrically and is set forth in the Table.

EXAMPLE 6

Released Dye

A released dye (i.e., not attached to a ballasted carrier) having the following formula:

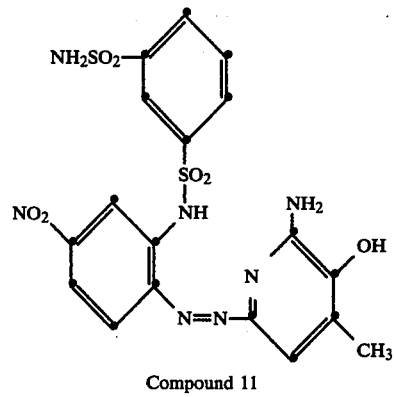

Compound 11 was dissolved in an alkaline solution having the final composition: Dye $2.5 \times 10^{-3}$ M, sodium hydroxide 0.5 m and hydroxyethylcellulose 30 g/l. This solution was applied to a transparent mordanted sheet on which was coated a mixture of a polymeric latex mordant poly(styrene-co-N-benzyl-N,N-dimethyl-N-vinylbenzylammonium chloride-co-divinylbenzene) and gelatin (each at 2.2 g/m$^2$). Strips of the dyed sheet were metallized by soaking in a cupric nitrate-tartaric acid solution, phosphate buffered to pH 6.0. Spectrophotometric curves were run on strips bufferred in a phosphate buffer to pH 7.0. Other strips were washed after metallization and subjected to 10 days of the high-intensity daylight (5000 footcandles) fading. The loss in density was measured spectrophotometrically and is set forth in Table I.

TABLE I

| Compound Number | Diffusibility % after (sec) | | | Hue $\lambda_{max}$ (nm) | ½ BW(nm) | Me$^{++}$ | Light Stability | |
|---|---|---|---|---|---|---|---|---|
| | 30 | 60 | 120 | | | | $D_o$ | ΔD |
| 1 | 43 | 71 | 94 | 635 | 143 | Cu | 1.58 | −0.70 |
| 1 | | | | 645 | 158 | Ni | 1.38 | −0.54 |
| 1 | | | | 629 | 174 | None (H) | — | — |
| 11 | — | — | — | 640 | — | Cu | 1.76 | −0.92 |

EXAMPLE 7

Photographic Test

A single-color integral-imaging receiver element was prepared by coating successively on a polyester film support (1) a metallizing layer comprising gelatin (1.08 g/m$^2$) and nickel sulfate hexahydrate (0.58 g/m$^2$), (2) a receiving layer comprising a mixture of gelatin and poly(4-vinylpyridine), (each at 2.15 g/m$^2$), (3) a reflecting layer comprising titanium dioxide and gelatin in a 6.25/1ratio, (4) an opaque layer of carbon dispersed in gelatin, (5) a layer comprising gelatin and a dispersion of Compound 1 (0.84 g/m$^2$), (6) a layer of a green-sensitized internal image emulsion as described in Evans, U.S. Pat. No. 3,761,276 (2.69 g/m$^2$ Ag, 2.69 g/m$^2$ gelatin), with fogging agents NA-16 and H-25 of Leone et al, U.S. Pat. No. 4,030,925, issued June 21, 1977, and 5-octadecylhydraquinone-2-sulfonic acid (16 g/mole Ag), (7) a layer of didodecylhydroquinone (1.29 g/m$^2$) dispersed in gelatin (1.61 g/m$^2$), and (8) a gelatin overcoat layer. In a comparative coating in which no metal ion is used to chelate the dye, the entire layer 1 was omitted. Layers 1 and 2 above form no part of the invention, as they are the subject of an invention by my coworkers Brust, Hamilton and Wilkes, U.S. application Ser. No. 003,169, filed Jan. 15, 1979.

This integral element was exposed to a multicolor test object, then processed by spreading between it and a processing cover sheet, as described in U.S. Pat. No. 4,061,496 of Hannie et al, issued Dec. 6, 1977, at 22° C., a viscous processing composition, as described in said U.S. Pat. No. 4,061,496 of Hannie et al, by passing the transfer "sandwich" between a pair of juxtaposed rollers so that the liquid layer was about 75 μm. The dye reflection density in the unexposed areas (i.e., $D_{max}$ areas) was measured with a recording spectrophotometer. Spectrophotometric curves were obtained on the final $D_{max}$, the $\lambda_{max}$ (i.e., wavelength at $D_{max}$) and "half band width" (½ BW) being recorded in Table II. The "half band width" is the wavelength range at half the $D_{max}$, a measure of purity of hue: The narrower the ½ BW, the purer the hue. The light stability was determined by exposing part of the strip to a high intensity daylight (5000 foot candles) light source for two days. Values are given for the original density $D_o$, the final faded density $D_f$, and the density loss $\Delta D$.

TABLE II

| Compound Number | Me++ | Hue $\lambda_{max}$ (nm) | ½ BW (nm) | $D_o$ | $D_F$ | $\Delta D$ |
|---|---|---|---|---|---|---|
| 1 | Ni | 658, 631 | 181 | 2.20 | 2.21 | +.01 |
| 1 | None (H) | 603 | 211 | 1.73 | 1.67 | −.06 |

EXAMPLE 8

Preparation of Compound 10

A solution of nitrosylsulfuric acid was prepared by heating a mixture of sodium nitrite (1.04 g) in concentrated sulfuric acid (10 ml) to 70° C. in a dry nitrogen atmosphere for 15 minutes. The solution was cooled and added to a suspension of 2,5-bis{[N-(2-amino-5-nitrophenoxycarbamoyl)-N-dodecylamino]methyl}-3,6-bis[1-(p-t-butylphenyl)ethyl]benzoquinone (7.88 g, 6.65 mmole) in a "mixed acid" of ice-cold propionic acid/acetic acid (100 ml, 1:5). After 2 hours, the resulting solution was added to an ice-cold mixture of 2-amino-3-hydroxy-5-phenylsulfamoylpyridine (5.0 g, 18.9 mmole) in methanol (100 ml), tetrahydrofuran (100 ml), and additional "mixed acid" (350 ml) containing sodium acetate (100 g).

The reaction mixture, cooled in ice, was stirred overnight in the dark, diluted with water (2000 ml) and filtered to obtain a solid which was washed with water, slurried in methanol, collected again by filtration, and air dried; yield, 11.50 g (crude) of the following compound (99.8 percent):

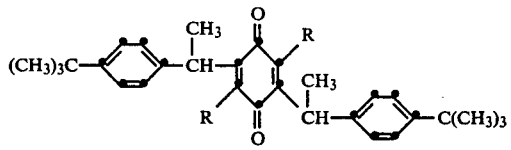

-continued

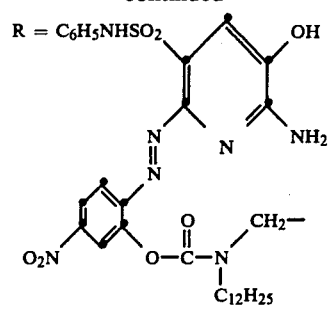

A solution of the above dye (5.35 g, 3.09 mmole) in pyridine in an atmosphere of dry nitrogen was treated portion-wise with 2-(N-methyltrifluoroacetamido)-methyl-1-N-methyl-N-phenylcarbamoylchloride (3.03 g, 9.7 mmole) over 3 hours. The reaction mixture was concentrated over 1 hour in a stream of $N_2$ and the residue diluted with dichloromethane (150 ml). The solution was washed (4 times) with 1N HCl, dried ($Na_2SO_4$) and evaporated to 7.53 g of glassy product which was chromatographed on a column of silica gel (200 g) using an eluant of dichloromethane/ethyl ether (100:12).

The fractions containing the desired product were combined and treated again using high pressure liquid column chromatography on silica gel using an eluant of toluene, ethyl acetate and ethyl ether (100:50:5). Fractions containing only desired product were chromatographed a third time on a column of silica gel (60 g) using an eluant of dichloromethane and ethyl ether (100:12); yield, 2.00 g (28.9 percent) of the dye-releasing Compound 10.

EXAMPLE 9

Photographic Test—Compound 10

A single-color photosensitive element was prepared by coating on a subbed (2.16 g gelatin/m²) polyester film support: (1) a photosensitive silver halide layer comprising a red-sensitive 0.82 μm monodispersed silver bromide gelatin emulsion (1.0 g/ Ag/m², 3.2 g gelatin/m²), and a dispersion of a mixture of (a) Compound 10 (0.51 g/m²), and (b) ballasted reducing agent precursor 4-(2-acetoxy-2-pivaloyl-acetamideo)-N-[4-(2,4-di-t-pentylphenoxy)-butyl]-1-hydroxy-2-naphthamide (1.02 g/m²) dissolved in diethyllauramide (1.53 g/m²), and (2) a gelatin overcoat layer (0.54 g/m²).

This element was exposed through a graduated-density step tablet to a light source. It was then processed by spreading between it and an image-receiving element described below at 22° C., a viscous processing composition by passing the transfer "sandwich" between a pair of juxtaposed rollers so that the liquid layer was 75 μm.

The receiving element comprised the following layers coated on a polyester film support: (1) a metallizing layer comprising gelatin (1.08 g/m²) and nickel sulfate hexahydrate (0.58 g/m²), (2) a receiving layer comprising a mixture of gelatin and poly(4-vinylpyridine) (each at 2.15 g/m²), (3) a reflecting layer comprising titanium dioxide and gelatin in a 6.25/1.0 ratio, (4) an opaque layer of carbon dispersed in gelatin, and (5) an overcoat layer of gelatin (2.13 g/m²).

The viscous processing composition comprised per liter of water: potassium hydroxide (51 g), 4-hydroxymethyl-4-methyl-1-phenyl-3-pyrazolidinone (3.0 g), potassium bromide (20 g), 5-methylbenzotriazole (1.0 g), and carboxymethylcellulose (30 g).

After 10 minutes, the elements were peeled apart and the receiving element was washed and dried. The metallized cyan dye absorbed at 685 nm.

The invention has been described in detail with particular reference to preferred embodiments thereof, but it will be understood that variations and modifications can be effected within the spirit and scope of the invention.

What is claimed is:

1. A nondiffusible compound having a releasable 6-arylazo-2-amino-3-pyridinol dye moiety or precursor thereof, said compound containing in the ortho position of the arylazo moiety a ballasted carrier moiety attached thereto either through a sulfonamido linking group or through the oxygen of a

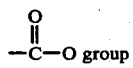

which said ballasted carrier moiety contains, and wherein said ballasted carrier moiety will release said diffusible 6-arylazo-2-amino-3-pyridinol dye or precursor thereof under alkaline conditions.

2. The compound of claim 1 which has the formula:

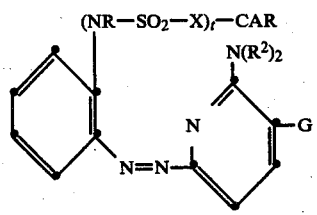

wherein:
(a) X represents a bivalent linking group of the formula $-R^1-L_n-R^1{}_p-$ where each $R^1$ can be the same or different and each represents alkylene having 1 to about 8 carbon atoms; phenylene; or substituted phenylene having 6 to about 9 carbon atoms;
(b) L represents a bivalent radical selected from oxy, imino, carbonyl, carboxamido, carbamoyl, sulfonamido, ureylene, sulfamoyl, sulfinyl or sulfonyl;
(c) n is an integer of 0 or 1;
(d) p is 1 when n equals 1 and p is 1 or 0 when n equals 0, provided that when p is 1 the carbon content of the sum of both $R^1$ radicals does not exceed 14 carbon atoms;
(e) R represents hydrogen, hydrolyzable acyl having the formula $-COR^3$ or $-COOR^3$, wherein $R^3$ is alkyl or substituted alkyl having 1 to about 4 carbon atoms or aryl or substituted aryl having 6 to about 8 carbon atoms, or hydrolyzable alkanesulfonyl having 1 to about 4 carbon atoms;
(f) each $R^2$ represents hydrogen, alkyl or substituted alkyl having 1 to about 6 carbon atoms or aryl or substituted aryl having 6 to about 8 carbon atoms;
(g) CAR represents said ballasted carrier moiety;
(h) t is an integer of 0 or 1, with the proviso that when t is 0 then CAR contains a

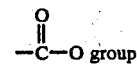

and is attached to the phenyl group through the oxygen of said

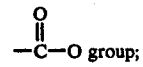

and
(i) G represents hydroxy or a precursor thereof.

3. The compound of claim 2 wherein the phenyl group is substituted with a nitro group para to the azo linkage and each $R^2$ is H.

4. The compound of claim 2 wherein CAR is a group having the formula:

(Ballast-Carrier)— wherein:
(a) Ballast is an organic ballasting radical of such molecular size and configuration as to render said compound nondiffusible in a photographic element during development in an alkaline processing composition; and
(b) Carrier is an oxidizable acyclic, carbocyclic or heterocyclic moiety.

5. The compound of claim 4 wherein the Carrier moiety contains atoms according to the following configuration:

$$a(-C=C)_b-$$

wherein:
b is a positive integer of 1 to 2; and
a represents the radicals OH, SH, NH—, or hydrolyzable precursors thereof.

6. The compound of claim 2 wherein CAR is a group having the formula:

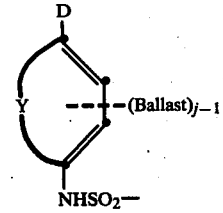

wherein:
(a) Ballast is an organic ballasting radical of such molecular size and configuration as to render said compound nondiffusible in a photographic element during development in an alkaline processing composition;
(b) D is $OR^4$ or $NHR^5$ wherein $R^4$ is hydrogen or a hydrolyzable moiety and $R^5$ is hydrogen or substituted or unsubstituted alkyl of 1 to 22 carbon atoms;
(c) Y represents the atoms necessary to complete a benzene nucleus, a naphthalene nucleus, or a 5 to 7 membered heterocyclic ring; and
(d) j is a positive integer of 1 to 2 and is 2 when D is $OR^4$ or when $R^5$ is hydrogen or alkyl of less than 8 carbon atoms.

7. The compound of claim 6 wherein D is OH, j is 2, Y is a naphthalene nucleus, R is H, each $R^2$ is H, X is phenylene, and the phenyl group is substituted with a nitro group para to the azo linkage.

8. The compound of claim 2 wherein said CAR will release said diffusible 6-arylazo-2-amino-3-pyridinol dye or precursor thereof as an inverse function of development of a silver halide emulsion layer under alkaline conditions.

9. The compound of claim 8 wherein said CAR is a group having the formula:

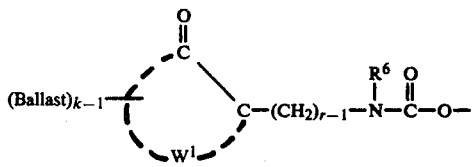

wherein:
Ballast is an organic ballasting radical of such molecular size and configuration as to render said compound nondiffusible in a photographic element during said development in an alkaline processing composition;
$W^1$ represents at least the atoms necessary to complete a quinone nucleus;
r is a positive integer of 1 or 2;
$R^6$ is alkyl having 1 to about 40 carbon atoms or aryl having 6 to about 40 carbon atoms; and
k is a positive integer of 1 to 2 and is 2 when $R^6$ has less than 8 carbon atoms.

10. The compound of claim 8 wherein said CAR is a group having the formula:

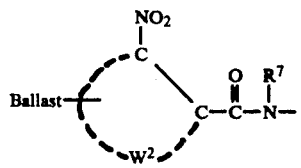

wherein:
Ballast is an organic ballasting radical of such molecular size and configuration as to render said compound nondiffusible in a photographic element during said development in an alkaline processing composition;
$W^2$ represents at least the atoms necessary to complete a benzene nucleus; and
$R^7$ is alkyl having 1 to about 4 carbon atoms.

11. The compound of claim 8 wherein said CAR is a group having the formula:

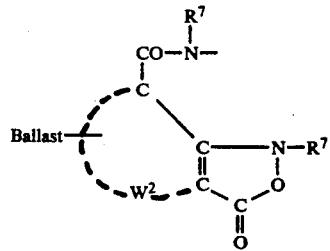

wherein:
Ballast is an organic ballasting radical of such molecular size and configuration as to render said compound nondiffusible in a photographic element during said development in an alkaline processing composition;
$W^2$ represents at least the atoms necessary to complete a benzene nucleus; and
$R^7$ is alkyl having 1 to about 4 carbon atoms.

12. The compound of claim 8 wherein said CAR is a group having the formula:

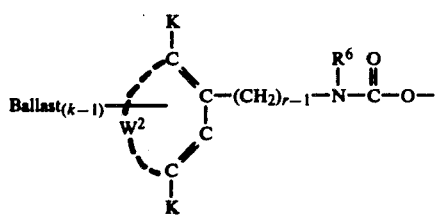

wherein:
Ballast is an organic ballasting radical of such molecular size and configuration as to render said compound nondiffusible in a photographic element during said development in an alkaline processing composition;
$W^2$ represents at least the atoms necessary to complete a benzene nucleus;
r is a positive integer of 1 or 2;
$R^6$ is alkyl having 1 to about 40 carbon atoms or aryl having 6 to about 40 carbon atoms;
k is a positive integer of 1 to 2 and is 2 when $R^6$ has less than 8 carbon atoms; and
K is OH or a hydrolyzable precursor thereof.

13. The compound of claim 1 wherein said dye-releasing compound is:

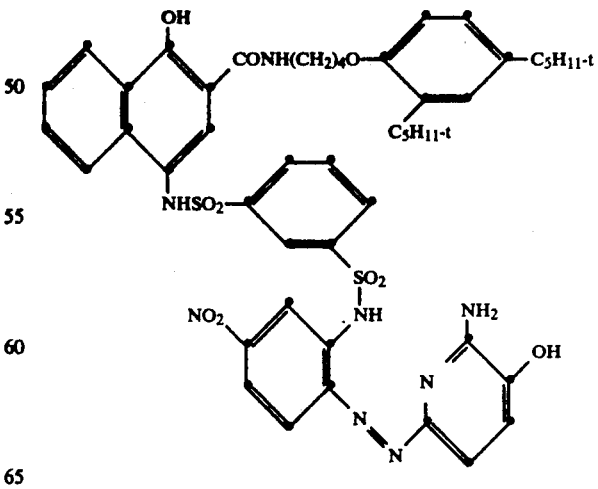

14. The compound of claim 1 wherein said dye-releasing compound is:

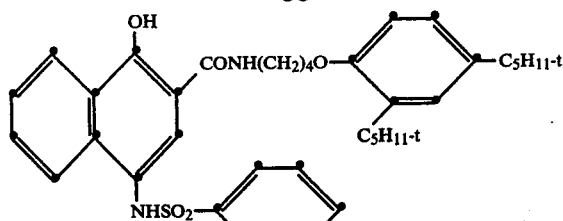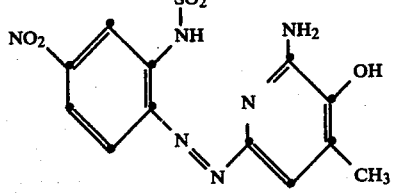
* * * * *